(12) United States Patent
Kim et al.

(10) Patent No.: US 8,792,375 B2
(45) Date of Patent: Jul. 29, 2014

(54) DATA RATE MATCHING METHOD AND APPARATUS FOR USE IN MOBILE COMMUNICATION SYSTEMS

(75) Inventors: Nam Il Kim, Daejeon (KR); Dae Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 13/332,875

(22) Filed: Dec. 21, 2011

(65) Prior Publication Data

US 2012/0163211 A1 Jun. 28, 2012

(30) Foreign Application Priority Data

Dec. 23, 2010 (KR) .................. 10-2010-0133081

(51) Int. Cl.
*H04W 24/00* (2009.01)
(52) U.S. Cl.
USPC ........... 370/252; 370/241; 370/229; 370/230; 370/230.1; 370/231; 370/232
(58) Field of Classification Search
CPC .................................................. H04W 28/042
See application file for complete search history.

(56) References Cited

U.S. PATENT DOCUMENTS

| | | | | |
|---|---|---|---|---|
| 2002/0007475 A1* | 1/2002 | Crozier | .......... | 714/758 |
| 2002/0091900 A1* | 7/2002 | Han | .......... | 711/127 |
| 2002/0124221 A1* | 9/2002 | Goldman | .......... | 714/755 |
| 2002/0194554 A1* | 12/2002 | Ferrari et al. | .......... | 714/701 |
| 2003/0026346 A1* | 2/2003 | Matsumoto et al. | .......... | 375/262 |
| 2003/0133497 A1* | 7/2003 | Kinjo et al. | .......... | 375/152 |
| 2004/0139378 A1* | 7/2004 | Akhter et al. | .......... | 714/755 |
| 2004/0146029 A1* | 7/2004 | Tong et al. | .......... | 370/335 |
| 2005/0044466 A1* | 2/2005 | Ishida | .......... | 714/755 |
| 2005/0154954 A1* | 7/2005 | Maru | .......... | 714/746 |
| 2007/0083803 A1* | 4/2007 | Chen et al. | .......... | 714/755 |
| 2007/0189231 A1* | 8/2007 | Chang et al. | .......... | 370/335 |
| 2011/0167315 A1* | 7/2011 | Kyung et al. | .......... | 714/752 |

FOREIGN PATENT DOCUMENTS

EP 1569374 A2 * 8/2005 ............... H04L 1/00

OTHER PUBLICATIONS

A Code-Matched Interleaver Design for Turbo Codes, Feng et al, IEEE Transactions of Communications, vol. 50, No. 6, Jun. 2002.*
ARP and QPP interleavers for LTE Turbo Coding, Nimbalker et al, WCNC 2008 Proceedings.*
Adaptive Coding and Modulation for Return Satellite Links using Binary Turbo Coding, Crozier et al, IEEE 2010 4th Advanced Satellite Multimedia Sytsems Conference and the 11th Signal Processing for Space Communications Workshop.*
Analysis of Circular Buffer Rate Matching for LTE Turbo Code, Cheng et al, 2008, IEEE.*

* cited by examiner

*Primary Examiner* — Hassan Phillips
*Assistant Examiner* — Gautam Sharma
(74) *Attorney, Agent, or Firm* — Nelson Mullins Riley & Scarborough LLP

(57) ABSTRACT

Disclosed are a data rate matching method and apparatus for use in mobile communication systems that can perform parallel interleaving at a high speed without a collision between encoded data input in parallel. A set of first parameters ($f_1$) is calculated on the basis of a length (D) of encoded input data and a set of second parameters ($f_2$) is calculated on the basis of a set of prime numbers constituting a value of the length (D) of the input data. Interleaving is performed on the basis of the set of first parameters ($f_1$), the set of second parameters ($f_2$), and the length (D) of the input data.

10 Claims, 6 Drawing Sheets

FIG. 2

| k | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| OUTPUT ADDRESS OF SUB-BLOCK INTERLEAVER | Bank0 | 0 | 32 | 16 | 48 | 8 | 40 | 24 | 56 | 4 | 36 | 20 | 52 | 12 | 44 | 28 | 60 |

| k | | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| OUTPUT ADDRESS OF SUB-BLOCK INTERLEAVER | Bank0 | 2 | 34 | 18 | 50 | 10 | 42 | 26 | 58 | 6 | 38 | 22 | 54 | 14 | 46 | 30 | 62 |

| k | | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|
| OUTPUT ADDRESS OF SUB-BLOCK INTERLEAVER | Bank0 | 1 | 33 | 17 | 49 | 9 | 41 | 25 | 57 | 5 | 37 | 21 | 53 | 13 | 45 | 29 | 61 |

| k | | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|
| OUTPUT ADDRESS OF SUB-BLOCK INTERLEAVER | Bank0 | 3 | 35 | 19 | 51 | 11 | 43 | 27 | 59 | 7 | 39 | 23 | 55 | 15 | 47 | 31 | 63 |

FIG. 3

| k | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| OUTPUT ADDRESS OF SUB-BLOCK INTERLEAVER | Bank0 | 0 | 16 | 8 | 24 | 4 | 20 | 12 | 28 | 2 | 18 | 10 | 26 | 6 | 22 | 14 | 30 |
| | Bank1 | 32 | 48 | 40 | 56 | 36 | 52 | 44 | 60 | 34 | 50 | 42 | 58 | 38 | 54 | 46 | 62 |
| | COLLISION | O | O | O | O | O | O | O | O | O | O | O | O | O | O | O | O |

| k | | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| OUTPUT ADDRESS OF SUB-BLOCK INTERLEAVER | Bank0 | 1 | 17 | 9 | 25 | 5 | 21 | 13 | 29 | 3 | 19 | 11 | 27 | 7 | 23 | 15 | 31 |
| | Bank1 | 33 | 49 | 41 | 57 | 37 | 53 | 45 | 61 | 35 | 51 | 43 | 59 | 39 | 55 | 47 | 63 |
| | COLLISION | O | O | O | O | O | O | O | O | O | O | O | O | O | O | O | O |

FIG. 6

| k | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|----|----|----|----|----|----|
| OUTPUT ADDRESS OF SUB-BLOCK INTERLEAVER | Bank0 | 0 | 22 | 12 | 34 | 24 | 46 | 36 | 58 | 48 | 6 | 60 | 18 | 8 | 30 | 20 | 42 |
| | Bank1 | 7 | 45 | 51 | 25 | 31 | 5 | 44 | 49 | 55 | 29 | 35 | 9 | 15 | 53 | 59 | 33 |
| | COLLISION | - | - | - | - | - | - | - | - | - | - | - | - | - | - | - | - |

| k | | 16 | 17 | 18 | 19 | 20 | 21 | 22 | 23 | 24 | 25 | 26 | 27 | 28 | 29 | 30 | 31 |
|---|---|----|----|----|----|----|----|----|----|----|----|----|----|----|----|----|----|
| OUTPUT ADDRESS OF SUB-BLOCK INTERLEAVER | Bank0 | 32 | 54 | 44 | 2 | 56 | 14 | 4 | 26 | 16 | 38 | 28 | 50 | 40 | 62 | 52 | 10 |
| | Bank1 | 39 | 13 | 19 | 57 | 63 | 37 | 43 | 17 | 23 | 61 | 3 | 41 | 47 | 21 | 27 | 1 |
| | COLLISION | - | - | - | - | - | - | - | - | - | - | - | - | - | - | - | - |

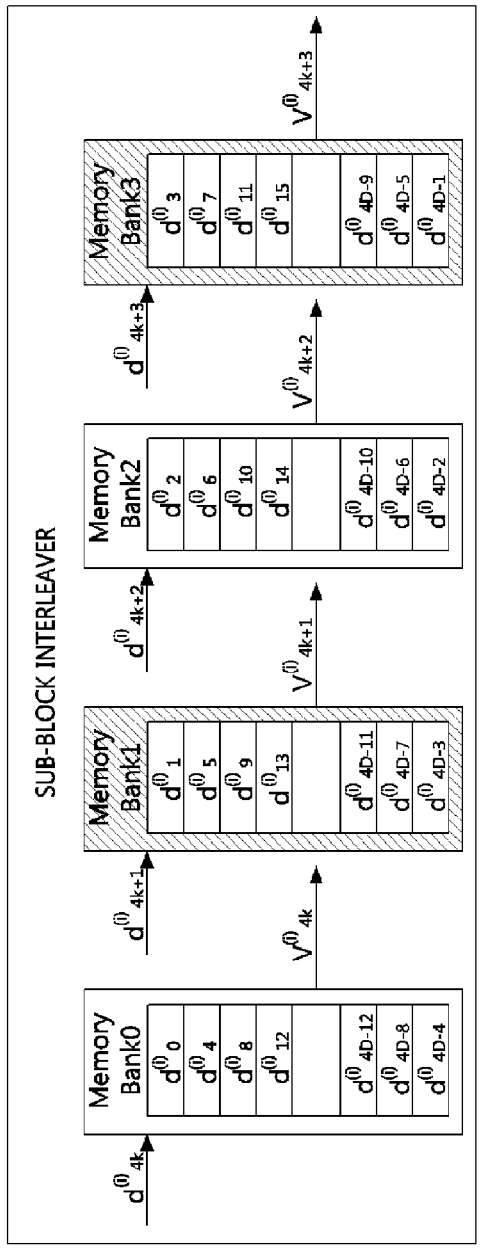

DATA RATE MATCHING METHOD AND APPARATUS FOR USE IN MOBILE COMMUNICATION SYSTEMS

CLAIM FOR PRIORITY

This application claims priority to Korean Patent Application No. 10-2010-0133081 filed on Dec. 23, 2010 in the Korean Intellectual Property Office (KIPO), the entire contents of which are hereby incorporated by reference.

BACKGROUND

1. Technical Field

Example embodiments of the present invention relate to data transmission of mobile communication systems, and more particularly, to a data rate matching method and apparatus for use in mobile communication systems.

2. Related Art

In 3rd Generation Partnership Project (3GPP) and long term evolution (LTE)-advanced systems, a rate matcher performs data rate matching for matching a length of turbo encoded data or convolutionally encoded data with a length of data required for wireless transmission in a data encoding process of a transmission stage, and a de-rate matcher performs de-rate matching for matching a length of data received by wireless transmission with a length of input data of a turbo decoder or a convolutional decoder in a data decoding process of a reception stage opposite to the transmission stage.

However, because a sub-block interleaver of a rate matcher of the related art is configured to process only a single-bit input for input bit data, there is a disadvantage in that processing of parallel data input of two or more bits may not be possible. That is, the rate matcher of the related art has a problem in that a data collision occurs in a memory where input data is stored, if data is input in parallel to the rate matcher of the related art.

SUMMARY

Accordingly, example embodiments of the present invention are provided to substantially obviate one or more problems due to limitations and disadvantages of the related art.

Example embodiments of the present invention provide a data rate matching method for use in mobile communication systems that can perform parallel interleaving at a high speed without a collision between encoded data input in parallel.

Example embodiments of the present invention also provide a data rate matching apparatus for use in mobile communication systems that can perform parallel interleaving at a high speed without a collision between encoded data input in parallel.

In some example embodiments, a data rate matching method for use in a data rate matching apparatus including a plurality of interleavers in mobile communication systems, includes: calculating a set of first parameters ($f_1$) based on a length (D) of encoded input data input to the plurality of interleavers in series or parallel; calculating a set of second parameters ($f_2$) based on a set of prime numbers constituting a value of the length (D) of the input data; and performing interleaving based on the set of first parameters ($f_1$), the set of second parameters ($f_2$), and the length (D) of the input data.

The calculating of the set of first parameters ($f_1$) may include: calculating all values satisfying 1, which is a greatest common divisor of the first parameter ($f_1$) and the length (D) of the input data, as the first parameters when the length (D) of the input data is not a multiple of 2, or is a multiple of 4.

The calculating of the set of first parameters ($f_1$) may include: calculating all values satisfying 1, which is a greatest common divisor of the first parameter ($f_1$) and half the length (D) of the input data, as the first parameters when the length (D) of the input data is a multiple of 2 and not a multiple of 4.

The calculating of the set of second parameters ($f_2$) may include: calculating the set of second parameters ($f_2$) using $f_2 = \Pi_{p \in P} \, p^{n_{F,p}}$ for all p satisfying $n_{F,p} \geq 1$ and $n_{N,p} \geq 1$, where P is a set of prime numbers among divisors of the length (D) of the input data, and p is an element of the set of prime numbers, when the length (D) of the input data is not a multiple of 2, or is a multiple of 4.

The calculating of the set of second parameters ($f_2$) may include: calculating the set of second parameters ($f_2$) using $f_2 = \Pi_{p \in P} \, p^{n_{F,p}}$ for all p satisfying $n_{F,p} \geq 1$, $p \neq 2$, and $n_{N,p} \geq 1$, where a sum of the first to parameter ($f_1$) and the second parameter ($f_2$) is an odd number, when the length (D) of the input data is a multiple of 2 and not a multiple of 4.

The performing of the interleaving may include: generating interleaved output data by applying the first parameter ($f_1$) and the second parameter ($f_2$) to $\Pi(k) = \mathrm{mod}((f_1 k + f_2 k^2), D)$, where $k = 0, 1, \ldots, K_\Pi$ and $K_\Pi$ denotes the size of a matrix.

In other example embodiments, a data rate matching apparatus for use in mobile communication systems, includes: a plurality of sub-block interleavers configured to calculate a set of first parameters ($f_1$) based on a length (D) of encoded input data input in series or parallel, calculate a set of second parameters ($f_2$) based on a set of prime numbers constituting a value of the length (D) of the input data, and perform interleaving based on the set of first parameters ($f_1$), the set of second parameters ($f_2$), and the length (D) of the input data.

BRIEF DESCRIPTION OF DRAWINGS

Example embodiments of the present invention will become more apparent by describing in detail example embodiments of the present invention with reference to the accompanying drawings, in which:

FIG. 2 is an output memory address of a sub-block interleaver;

FIG. 3 shows the relationship between an output memory address and a collision when data is input to the sub-block interleaver in parallel;

FIG. 6 shows an output address of the sub-block interleaver according to an example embodiment of the present invention;

FIG. 7 is a conceptual diagram showing a configuration of an internal memory of a sub-block interleaver according to another example embodiment of the present invention; and FIG. 8 shows an output address of the sub-block interleaver according to another example embodiment of the present invention.

DESCRIPTION OF EXAMPLE EMBODIMENTS

Figure 1:
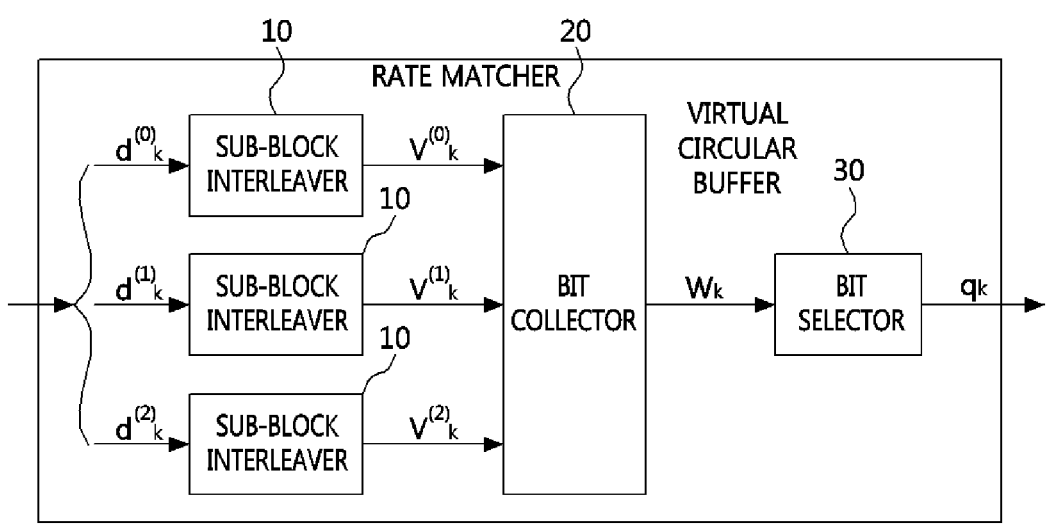
FIG. 1 is a block diagram showing a rate matcher of a 3GPP LTE system.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. To understand the invention easily, the same elements are designated using the same reference numerals, and redundant description thereof is omitted.

FIG. 1 is a block diagram showing a rate matcher of a 3GPP LTE system, and FIG. 2 is an output memory address of a sub-block interleaver. FIG. 3 shows the relationship between an output memory address and a collision when data is input to the sub-block interleaver in parallel.

The rate matcher for data rate matching of turbo encoded data includes a plurality of sub-block interleavers 10 for interleaving three bit streams $d^{(0)}_k$, $d^{(1)}_k$, and $d^{(2)}_k$, a bit collector 20, and a bit selector 30.

The plurality of sub-block interleavers 10 interleave input bit streams $d^{(i)}_k$ into interleaved data streams $v^{(i)}_k$ (where i=0, 1, 2 and k=0, 1, ..., $K_\Pi$). Bits are selected from the interleaved data streams through a virtual circular buffer according to output bit size, and then a sequence of bits $q_k$ is output.

The sub-block interleaver 10 interleaves input bits $d^{(i)}_0$, $d^{(i)}_1, d^{(i)}_2, \ldots, d^{(i)}_{D-1}$ (where D is the number of input bits and i=0, 1, 2), and outputs bits $v^{(i)}_0, v^{(i)}_1, v^{(i)}_2, \ldots, v^{(i)}_{K_\Pi-1}$ (where $K_\Pi$ is defined below and i=0, 1, 2).

An output bit sequence of the sub-block interleaver 10 is derived as follows.

First, the number of columns of a matrix is denoted by $C_{subblock}=32$ (where the columns of the matrix are numbered 0, 1, 2, ..., $C_{subblock}-1$ from left to right), and a minimum integer $R_{subblock}$ satisfying $D \leq (R_{subblock} \times C_{subblock})$ is calculated. Here, the rows of the rectangular matrix are numbered 0, 1, 2, ..., $R_{subblock}-1$ from top to bottom.

If $(R_{subblock} \times C_{subblock}) > D$, $N_D = (R_{subblock} \times C_{subblock} - D)$ dummy bits are added (that is, $y_k = <NULL>$ and k=0, 1, ..., $N_D-1$). An input bit sequence is written into a $(R_{subblock} \times C_{subblock})$ matrix (that is, $y_{N_D+k} = d^{(i)}_k$ and k=0, 1, ..., D-1). At this time, a matrix is configured row by row starting with bit $y_0$ within column 0 of row 0 of the matrix as shown in Expression (1).

$$\begin{bmatrix} y_0 & y_1 & y_2 & \cdots & y_{C_{subblock}-1} \\ y_{C_{subblock}} & y_{C_{subblock}+1} & y_{C_{subblock}+2} & \cdots & y_{2C_{subblock}-1} \\ \vdots & \vdots & \vdots & \ddots & \vdots \\ y_{(R_{subblock}-1) \times C_{subblock}} & y_{(R_{subblock}-1) \times C_{subblock}+1} & y_{(R_{subblock}-1) \times C_{subblock}+2} & \cdots & y_{(R_{subblock} \times C_{subblock}-1)} \end{bmatrix} \quad (1)$$

Thereafter, for $d^{(0)}_k$ and $d^{(1)}_k$, inter-column permutation of the matrix is performed on the basis of an inter-column permutation pattern $\langle P(j) \rangle_{j \in \{0, 1, \ldots, C_{subblock}-1\}}$ of Table 1. Here, P(j) denotes an original column position of a j-th permutated column. After permutation of the columns, the inter-column permutated $(R_{subblock} \times C_{subblock})$ matrix is defined as Expression (2)

$$\begin{bmatrix} y_{P(0)} & y_{P(1)} & y_{P(2)} & \cdots & y_{P(C_{subblock}-1)} \\ y_{P(0)+C_{subblock}} & y_{P(1)+C_{subblock}} & y_{P(2)+C_{subblock}} & \cdots & y_{P(C_{subblock}-1)+C_{subblock}} \\ \vdots & \vdots & \vdots & \ddots & \vdots \\ y_{P(0)+(R_{subblock}-1) \times C_{subblock}} & y_{P(1)+(R_{subblock}-1) \times C_{subblock}} & y_{P(2)+(R_{subblock}-1) \times C_{subblock}} & \cdots & y_{P(C_{subblock}-1)+(R_{subblock}-1) \times C_{subblock}} \end{bmatrix} \quad (2)$$

TABLE 1

| Number of Columns $C_{subblock}$ | Inter-column permutation pattern $<P(0), P(1), \ldots, P(C_{subblock} - 1)>$ |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

The sub-block interleaver 10 generates an output by reading the inter-column permutated ($R_{subblock} \times C_{subblock}$) matrix as described above in units of columns. Sub-block-interleaved bits are $v_0^{(i)}, v_1^{(i)}, v_{2(i)}, \ldots, v_{K_\Pi-1}^{(i)}$. Here, $v_0^{(i)} = y_{P(0)}$, $v_1^{(i)}$ is $y_{P(0)+C_{subblock}}, \ldots$, and $K_\Pi = (R_{subblock} \times C_{subblock})$.

In addition, for $d_k^{(2)}$, outputs of the sub-block interleaver 10 become $v_0^{(2)}, v_1^{(2)}, v_2^{(2)}, \ldots, v_{K_\Pi-1}^{(2)}$. Here, $v_k^{(2)} = y_{\pi(K)}$ and $$\pi(k) = \left( P\left( \left\lfloor \frac{k}{R_{subblock}} \right\rfloor \right) + C_{subblock} \times (k \bmod R_{subblock}) + 1 \right) \bmod K_\Pi.$$

The bit collector 20 generates a virtual circular buffer having a length $K_w = 3K_\Pi$ by Expression (3).

$w_k = v_k^{(0)}$ for $k=0, \ldots, K_{\Pi-1}$ $w_{K_\Pi + 2k} = v_k^{(1)}$ for $k=0, \ldots, K_{\Pi-1}$ $w_{K_\Pi + 2k+1} = v_k^{(2)}$ for $k=0, \ldots, K_{\Pi-1}$ (3)

In addition, the bit collector 20 calculates a start position $K_0$ of bit selection of the rate matcher using Expression (4).

$$k_0 = R_{subblock} \cdot \left( 2 \cdot \left\lceil \frac{N_{cb}}{8 R_{subblock}} \right\rceil \cdot rv_{idx} + 2 \right) \quad (4)$$

In Expression (4), $R_{subblock}$ denotes the number of rows, and $N_{cb}$ denotes a buffer size (for example, $N_{cb} = K_w$). In addition, $rv_{idx}$ ($rv_{idx} = 0, 1, 2$ or $3$) denotes a redundancy version number of hybrid automatic repeat request (HARQ).

The bit selector 30 transmits output data by the following method:

```
Set k = 0 and j = 0
while { k < E }
    if w_(k_0 + j)mod N_cb ≠< NULL >
        e_k = w_j mod N_cb
        k = k +1
    end if
    j = j +1
end while
```

Here, E denotes the length of a rate matching output sequence, and $e_k$ ($k=0, 1, \ldots, E-1$) denotes a rate matching output bit sequence.

In the rate matcher as described above, $N_D = (R_{subblock} \times C_{subblock} - D)$ dummy bits are padded (that is, $y_k = <NULL>$) if $(R_{subblock} \times C_{subblock}) > D$ in the sub-block interleaving process. The dummy bits should be removed in the output data transmission process of the rate matcher. In implementation of the rate matcher that removes the dummy bits as described above, $(Q+N_D)$ data should be processed for an output of the rate matcher in spite of the length of output data Q of the rate matcher. This causes the output of the rate matcher to be discontinuous, and hence makes signal control with a module interfacing with an output stage of the rate matcher complex.

The sub-block interleaver 10 of the above-described rate matcher may process a single-bit input as input bit data, but may not process parallel data input of two or more bits.

For example, when the length of input data of the sub-block interleaver is D=64 and an input data sequence is input to one memory bit by bit, an input/output data relationship of the sub-block interleaver is as follows.

Interleaver Input Bits: $d_0^{(i)}, d_1^{(i)}, d_2^{(i)}, \ldots, d_{63}^{(i)}$, i=0, 1, 2

Interleaver Input Bits: $v_0^{(i)}, v_1^{(i)}, v_2^{(i)}, \ldots, v_{63}^{(i)}$, i=0, 1, 2

Main Parameters of Interleaver: $C_{subblock}=32$, $R_{subblock}=2$, $N_D=0$

The rate matcher output data corresponding to the above-described interleaver output bits is output from data of each memory through the interleaver address generation method as described above. That is, as shown in FIG. 2, a memory address to be used for output data generation of the sub-block for 1-bit input data is processed without a problem for a 1-bit output.

However, when the length of input data of the sub-block interleaver is D=64 and an input data sequence is input to two memories to which bits are input in parallel two by two, input data bits are simultaneously input two by two and stored in two memories as shown in FIG. 3.

Interleaver Input Bits bank 0: $d_0^{(i)}, d_2^{(i)}, d_4^{(i)}, \ldots, d_{2k}^{(i)}, \ldots, d_{62}^{(i)}$, k=0, 1, 2, \ldots, 31, i=0, 1, 2 bank 1: $d_1^{(i)}, d_3^{(i)}, d_5^{(i)}, \ldots, d_{63}^{(i)}$, k=0, 1, 2, \ldots, 31, i=0, 1, 2

Interleaver Output Bits bank 0: $v_0^{(i)}, v_2^{(i)}, v_4^{(i)}, \ldots, v_{2k}^{(i)}, \ldots, v_{62}^{(i)}$, k=0, 1, 2, \ldots, 31, i=0, 1, 2 bank 1: $v_1^{(i)}, v_3^{(i)}, v_5^{(i)}, \ldots, v_{2k+1}^{(i)}, \ldots, d_{63}^{(i)}$, k=0, 1, 2, \ldots, 31, i=0, 1, 2

Main Parameters of Interleaver: $C_{subblock}=32$, $R_{subblock}=2$, $N_D=0$

The rate matcher as shown in FIG. 3 has a problem in that a collision between two memories occurs when data is input to the sub-block interleaver in parallel.

Hereinafter, a data rate matching apparatus and method capable of performing parallel interleaving at a high speed without a collision between data input in parallel will be described.

Figure 4:
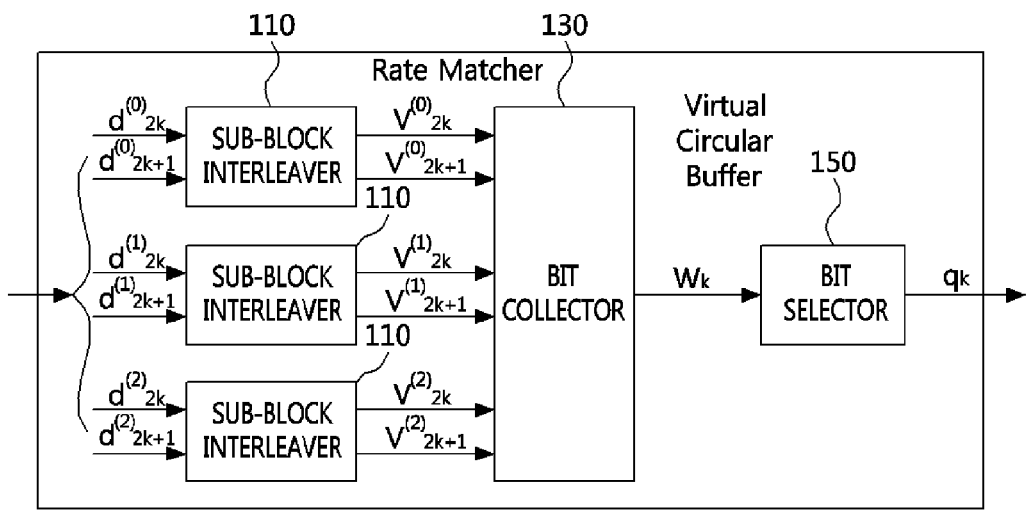
FIG. 4 is a block diagram showing a configuration of a data rate matching apparatus according to an example embodiment of the present invention.
Figure 5:
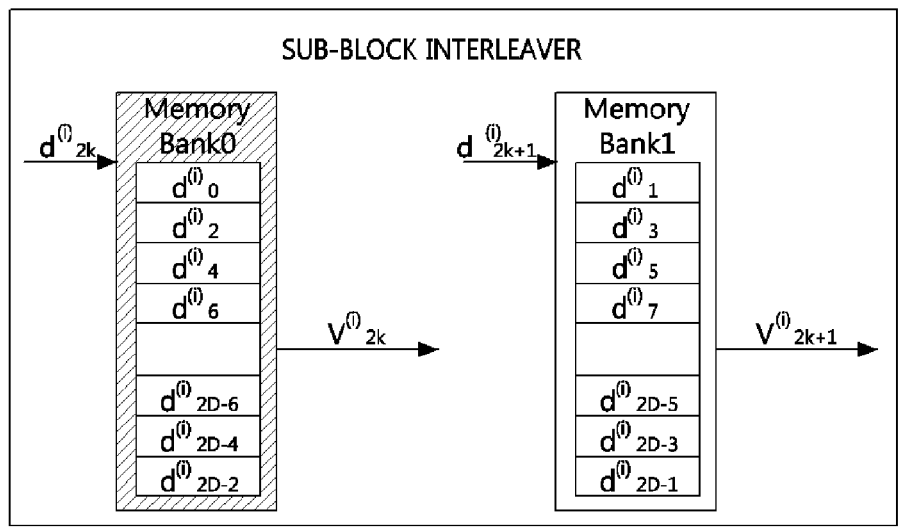
FIG. 5 is a conceptual diagram showing a configuration of an internal memory of the sub-block interleaver according to an example embodiment of the present invention.

FIG. 4 is a block diagram showing a configuration of a data rate matching apparatus according to an example embodiment of the present invention. FIG. 5 is a conceptual diagram showing a configuration of an internal memory of the sub-block interleaver according to an example embodiment of the present invention. FIG. 6 shows an output address of the sub-block interleaver according to an example embodiment of the present invention. FIG. 7 is a conceptual diagram showing a configuration of an internal memory of the sub-block interleaver according to another example embodiment of the present invention. FIG. 8 shows an output address of the sub-block interleaver according to another example embodiment of the present invention.

Referring to FIGS. 4 to 8, the data rate matching apparatus according to the example embodiment of the present invention includes a plurality of sub-block interleavers 110, a bit collector 130, and a bit selector 150.

The sub-block interleavers 100 interleave three information bit streams $d_k^{(0)}, d_k^{(1)}$, and $d_k^{(2)}$ input in parallel, and output interleaved data streams $v_k^{(i)}$ (i=0, 1, 2 and k=0, 1, \ldots, $K_\Pi$). After the interleaved data streams $v_k^{(i)}$ are collected in a virtual circular buffer generated in the bit collector 130, bits are selected by the bit selector 150 according to output bit size, and a sequence of bits $q_k$ is output.

The sub-block interleaver 100 interleaves input bits $d^{(i)}_0$, $d^{(i)}_1, d^{(i)}_2, \ldots, d^{(i)}_{D-1}$ (where D is the number of input bits and i=0, 1, 2), and outputs $v_{\Pi(0)}^{(i)}$, $v_{\Pi(1)}^{(i)}$, $v_{\Pi(2)}^{(i)}, \ldots$, $v_{\Pi(k)}^{(i)}, \ldots, v_{\Pi(D-1)}^{(i)}$ (where k=0 to D-1 and $v_{\Pi(k)}^{(i)}$ is a sub-block interleaver address). An output bit sequence of the sub-block interleaver is derived for $v_{\Pi(k)}^{(i)}$ according to an interleaver address as follows.

The sub-block interleaver 110 interleaves input data using the following Expression (5):

$$\Pi(k) = \mathrm{mod}((f_1 k + f_2 k^2), D) \quad (5)$$

In Expression (5), mod(a,b) is a modulus calculated value of a divided by b and is a remainder obtained by dividing a by b.

In Expression (5), $f_1$ and $f_2$ are set to differ according to the length of input data D of the sub-block interleaver 110. If D is not a multiple of 2 or is a multiple of 4, $f_1$ is calculated as defined in Expression (6), and $f_2$ is calculated as defined in Expression (7).

$$f_1 \text{ satisfying } \gcd(f_1, D) = 1 \quad (6)$$

In Expression (6), gcd(a,b) denotes the greatest common divisor of a and b.

$$f_2 = \Pi_{p \in P} p^{n_{F,p}} \text{ for all } p \text{ satisfying } n_{F,p} \geq 1 \text{ and } n_{N,p} \geq 1 \quad (7)$$

Alternatively, if D is a multiple of 2 and not a multiple of 4, $f_1$ is calculated as defined in Expression (8), and $f_2$ is calculated as defined in Expression (9).

$$f_1 \text{ satisfying } \gcd(f_1, D/2) = 1 \quad (8)$$

$$f_2 = \Pi_{p \in P} p^{n_{F,p}} \text{ for all } p \text{ satisfying } n_{F,p} \geq 1, p \neq 2, \text{ and } n_{N,p} \geq 1, \text{ where } f_1 + f_2 \text{ is an odd number} \quad (9)$$

For example, because P={2, 5} and D=$2^3 \times 5$ when D=40, $f_1 \in \{3, 7, 9, 11, 13, \ldots, 39\}$ and $f_2 \in \{10, 20, 30, 40\}$.

In Expressions (7) and (9), P denotes a set of prime numbers constituting the length D of input data of the sub-block interleaver, and elements of P is P={$p_1, p_2, \ldots, p_N$}. Here, $K = \Pi_{p \in P} p^{n_{N,p}}$.

Conditions of the following Expressions (10) to (12) should be satisfied to calculate $K = \Pi_{p \in P} p^{n_{N,p}}$ and $f_2 = \Pi_{p \in P} p^{n_{F,p}}$.

$$n_{F,2} \geq \begin{cases} \max\left(\left\lceil \frac{n_{K,2} - 2}{2} \right\rceil, 1\right) & \text{if } n_{K,2} > 0 \\ 0 & \text{if } n_{K,2} = 0 \end{cases} \quad (10)$$

$$n_{F,3} \geq \begin{cases} \max\left(\left\lceil \frac{n_{K,3} - 1}{2} \right\rceil, 1\right) & \text{if } n_{K,3} > 0 \\ 0 & \text{if } n_{K,3} = 0 \end{cases} \quad (11)$$

$$n_{F,p} \geq \left\lceil \frac{n_{K,p}}{2} \right\rceil \text{ if } p \neq 2, 3 \quad (12)$$

Using results calculated on the basis of the above Expressions (10) to (12), $f_2$ is defined as shown in Expression (13).

$$f_2 = \mathrm{mod}(\Pi_{p \in P} p^{n_{F,p}}, D) \quad (13)$$

For example, because P={2, 3, 5} and D=$2 \times 3^2 \times 5$ when D=90, $f_1 \in \{7, 11, 13, \ldots, 89\}$ and $f_2 \in \{2 \times 3 \times 5 \times 1, 2 \times 3 \times 5 \times 2, 2 \times 3 \times 5 \times 3\}$. At this time, data is interleaved using Expression (5) as an interleaver address generator polynomial by selecting values of $f_1$ and $f_2$ one by one.

In addition, because P={2} and D=$2 \times 2 \times 2 \times 2 \times 2 \times 2$ when D=64, $f_1 \in \{2\}$ and $f_2 \in \{4 \times 1, \text{ to } 4 \times 2, 4 \times 3, \ldots, \mathrm{mod}(4 \times m, D)\}$ (where m=1, 2, 3, ...). At this time, data is interleaved using Expression (5) as an interleaver address generator polynomial by selecting values of $f_1$ and $f_2$ one by one.

As compared to the related art, the sub-block interleaver 10 according to an example embodiment of the present invention may process bits in parallel two by two because a memory collision does not occur in an interleaving process when the length of input data is D=64 and bits are input in parallel two by two. For example, the sub-block interleaver 110 may interleave data by applying $f_1=3$ and $f_2=4$.

That is, when data bits are input to the sub-block interleavers two by two as described below, the data bits are stored in two memories as shown in FIGS. 5 and 6. For output data, data of the memories is interleaved and output according to the above-described method. At this time, in an interleaving method according to an example embodiment of the present invention, parallel processing may be performed without a collision between the two memories.

Sub-Block Interleaver Input Bits
bank 0: $d^{(i)}_0, d^{(i)}_2, d^{(i)}_4, \ldots, d^{(i)}_{2k}, \ldots, d^{(i)}_{62}$, k=0, 1, 2, ... 31, i=0, 1, 2
bank 1: $d^{(i)}_1, d^{(i)}_3, d^{(i)}_5, \ldots, d^{(i)}_{2k+1}, \ldots, d^{(i)}_{63}$, k=0, 1, 2, ..., 31, i=0, 1, 2

Sub-Block Interleaver Output Bits
bank 0: $v^{(i)}_0, v^{(i)}_2, v^{(i)}_4, \ldots, v^{(i)}_{2k}, \ldots, d^{(i)}_{62}$, k=0, 1, 2, ..., 31, i=0, 1, 2
bank 1: $v^{(i)}_1, v^{(i)}_3, v^{(i)}_5, \ldots, v^{(i)}_{2k+1}, \ldots, d^{(i)}_{63}$, k=0, 1, 2, ..., 31, i=0, 1, 2

Main Parameter of Sub-Block Interleaver
$\Pi(k) = \mathrm{mod}((f_1 k + f_2 k^2), D)$, where $f_1=3$ and $f_2=4$ Alternatively, when bits of data having an input data length D=64 are input to the sub-block interleavers in parallel four by four as described below, the data bits are stored in four memories as shown in FIGS. 7 and 8. For output data, data of the memories is interleaved and output according to the above-described method. At this time, in an interleaving method according to an example embodiment of the present invention, parallel processing may be performed without a collision between the four memories.

Sub-Block Interleaver Input Bits
bank 0: $d^{(i)}_0, d^{(i)}_4, d^{(i)}_8, \ldots, d^{(i)}_{4k}, \ldots, d^{(i)}_{60}$, k=0, 1, 2, ..., 15, i=0, 1, 2
bank 1: $d^{(i)}_1, d^{(i)}_5, d^{(i)}_9, \ldots, d^{(i)}_{4k+1}, \ldots, d^{(i)}_{61}$, k=0, 1, 2, ..., 15, i=0, 1, 2
bank 2: $d^{(i)}_2, d^{(i)}_6, d^{(i)}_{10}, \ldots, d^{(i)}_{4k+2}, \ldots, d^{(i)}_{62}$, k=0, 1, 2, ..., 15, i=0, 1, 2
bank 3: $d^{(i)}_3, d^{(i)}_7, d^{(i)}_{11}, \ldots, d^{(i)}_{4k+3}, \ldots, d^{(i)}_{63}$, k=0, 1, 2, ..., 15, i=0, 1, 2

Sub-Block Interleaver Output Bits
bank 0: $v^{(i)}_0, v^{(i)}_4, v^{(i)}_8, \ldots, v^{(i)}_{4k}, \ldots, v^{(i)}_{60}$, k=0, 1, 2, ..., 15, i=0, 1, 2
bank 1: $v^{(i)}_1, v^{(i)}_5, v^{(i)}_9, \ldots, v^{(i)}_{4k+1}, \ldots, v^{(i)}_{61}$, k=0, 1, 2, ..., 15, i=0, 1, 2
bank 2: $v^{(i)}_2, v^{(i)}_6, v^{(i)}_{10}, \ldots, v^{(i)}_{4k+2}, \ldots, v^{(i)}_{62}$, k=0, 1, 2, ..., 15, i=0, 1, 2
bank 3: $v^{(i)}_3, v^{(i)}_7, v^{(i)}_{11}, \ldots, v^{(i)}_{4k+3}, \ldots v^{(i)}_{63}$, k=0, 1, 2, ..., 15, i=0, 1, 2

Main Parameter of Sub-Block Interleaver
$\Pi(k) = \mathrm{mod}((f_1 k + f_2 k^2), D)$, where $f_1=3$ and $f_2=4$ According to the data rate matching method and apparatus for use in mobile communication systems as described above, a sub-block interleaver of a data rate matching apparatus of a transmitter provides a parallel processing function for parallel input data, and provides a high-speed efficient signal processing function by removing signal processing of dummy bits occurring according to the length of input data.

A decoding stage of a receiver can also provide a signal processing function for parallel input data in a data rate de-interleaving process by applying a sub-block interleaver according to an example embodiment of the present invention. This enables hardware to signal processing time to be reduced in an encoder and a decoder for transmission data, so that data can be transmitted at a high speed in a mobile communication system.

While the example embodiments of the present invention and their advantages have been described in detail, it should be understood that various changes, substitutions and alterations may be made herein without departing from the scope of the invention.

What is claimed is:

1. A data rate matching method for use in a data rate matching apparatus including a plurality of interleavers in mobile communication systems, comprising:
    calculating a set of first parameters ($f_1$) based on a length (D) of encoded input data input to the plurality of interleavers in series or parallel;
    calculating a set of second parameters ($f_2$) based on a set of prime numbers constituting a value of the length (D) of the input data; and
    performing interleaving based on the set of first parameters ($f_1$), the set of second parameters ($f_2$), and the length (D) of the input data,
    wherein the performing of the interleaving includes generating interleaved output data by applying the first parameter ($f_1$) and the second parameter ($f_2$) to $\Pi(k)=\mathrm{mod}((f_1k+f_2k^2), D)$, where $k=0, 1, \ldots, K_\Pi$ and $K_\Pi$ denotes a size of a matrix.

2. The data rate matching method of claim 1, wherein the calculating of the set of first parameters ($f_1$) includes:
    calculating all values satisfying 1, which is a greatest common divisor of the first parameter ($f_1$) and the length (D) of the input data, as the first parameters when the length (D) of the input data is not a multiple of 2, or is a multiple of 4.

3. The data rate matching method of claim 1, wherein the calculating of the set of first parameters ($f_1$) includes:
    calculating all values satisfying 1, which is a greatest common divisor of the first parameter ($f_1$) and half the length (D) of the input data, as the first parameters when the length (D) of the input data is a multiple of 2 and not a multiple of 4.

4. The data rate matching method of claim 1, wherein the calculating of the set of second parameters ($f_2$) includes:
    calculating the set of second parameters ($f_2$) using $f_2 = \Pi_{p \in P} p^{n_{F,p}}$ for all $p$ satisfying $n_{F,p} \geq 1$ and $n_{N,p} \geq 1$, where P is a set of prime numbers among divisors of the length (D) of the input data, and p is an element of the set of prime numbers, when the length (D) of the input data is not a multiple of 2, or is a multiple of 4.

5. The data rate matching method of claim 1, wherein the calculating of the set of second parameters ($f_2$) includes:
    calculating the set of second parameters ($f_2$) using $f_2 = \Pi_{p \in P} p^{n_{F,p}}$ for all $p$ satisfying $n_{F,p} \geq 1$, $p \neq 2$, and $n_{N,p} \geq 1$, where a sum of the first parameter ($f_1$) and the second parameter ($f_2$) is an odd number, when the length (D) of the input data is a multiple of 2 and not a multiple of 4.

6. A data rate matching apparatus for use in mobile communication systems, comprising:
    a plurality of sub-block interleavers configured to calculate a set of first parameters ($f_1$) based on a length (D) of encoded input data input in series or parallel, calculate a set of second parameters ($f_2$) based on a set of prime numbers constituting a value of the length (D) of the input data, and perform interleaving based on the set of first parameters ($f_1$), the set of second parameters ($f_2$), and the length (D) of the input data,
    wherein the plurality of subblock interleavers each generate interleaved output data by applying the first parameter ($f_1$) and the second parameter ($f_2$) to $\Pi(k)=\mathrm{mod}((f_1k+f_2k^2), D)$, where $k=0, 1, \ldots, K_\Pi$, and $K_\Pi$ denotes a size of a matrix.

7. The data rate matching apparatus of claim 6, wherein the plurality of sub-block interleavers each calculate all values satisfying 1, which is a greatest common divisor of the first parameter ($f_1$) and the length (D) of the input data, as the first parameters when the length (D) of the input data is not a multiple of 2 and is a multiple of 4.

8. The data rate matching apparatus of claim 6, wherein the plurality of sub-block interleavers each calculates all values satisfying 1, which is a greatest common divisor of the first parameter ($f_1$) and half the length (D) of the input data, as the first parameters when the length (D) of the input data is a multiple of 2 and not a multiple of 4.

9. The data rate matching apparatus of claim 6, wherein the plurality of sub-block interleavers each calculate the set of second parameters ($f_2$) using $f_2 = \Pi_{p \in P} p^{n_{F,p}}$ for all $p$ satisfying $n_{F,p} \geq 1$ and $n_{N,p} \geq 1$, where P is a set of prime numbers among divisors of the length (D) of the input data, and p is an element of the set of prime numbers, when the length (D) of the input data is not a multiple of 2, or is a multiple of 4.

10. The data rate matching apparatus of claim 6, wherein the plurality of sub-block interleavers each calculate the set of second parameters ($f_2$) using $f_2 = \Pi_{p \in P} p^{n_{F,p}}$ for all $p$ satisfying $n_{F,p} \geq 1$, $p \neq 2$, and $n_{N,p} \geq 1$, where a sum of the first parameter ($f_1$) and the second parameter ($f_2$) is an odd number, when the length (D) of the input data is a multiple of 2 and not a multiple of 4.

* * * * *